United States Patent [19]
Lee

[11] Patent Number: 5,994,852
[45] Date of Patent: Nov. 30, 1999

[54] WIDE BAND HIGH VOLTAGE STABILIZING CIRCUIT

[75] Inventor: Su-Chan Lee, Kyungki-do, Rep. of Korea

[73] Assignee: SamSung Electronics Co., Ltd., Kyungki-Do, Rep. of Korea

[21] Appl. No.: 08/985,268

[22] Filed: Dec. 4, 1997

[30] Foreign Application Priority Data

Dec. 4, 1996 [KR] Rep. of Korea ............. 96-61626

[51] Int. Cl.⁶ ............................. H01J 29/70
[52] U.S. Cl. ........................... 315/408; 315/411
[58] Field of Search ................... 315/408, 411; 348/730, 542, 377; 363/21

[56] References Cited

U.S. PATENT DOCUMENTS

| | | |
|---|---|---|
| 3,626,238 | 12/1971 | Forster . |
| 3,649,901 | 3/1972 | Waltner . |
| 3,657,632 | 4/1972 | Miyoshi . |
| 3,706,023 | 12/1972 | Yamada et al. . |
| 3,740,571 | 6/1973 | Richards, Jr. et al. . |
| 3,863,096 | 1/1975 | Sennik . |
| 5,266,871 | 11/1993 | Haferl . |
| 5,276,604 | 1/1994 | Messman .................. 363/55 |
| 5,317,495 | 5/1994 | Furukawa . |
| 5,420,484 | 5/1995 | Morrish . |
| 5,434,484 | 7/1995 | Murakami ............... 315/371 |
| 5,463,290 | 10/1995 | Fitzgerald . |
| 5,469,029 | 11/1995 | Jackson et al. . |
| 5,561,354 | 10/1996 | Simons et al. . |
| 5,614,794 | 3/1997 | Yu . |
| 5,625,261 | 4/1997 | Ogawa . |
| 5,644,198 | 7/1997 | Park . |
| 5,650,696 | 7/1997 | Krause et al. . |
| 5,656,890 | 8/1997 | Park . |
| 5,672,939 | 9/1997 | Hsiesh . |
| 5,682,083 | 10/1997 | Shin . |
| 5,691,609 | 11/1997 | Park . |
| 5,699,236 | 12/1997 | Choi .......................... 363/15 |
| 5,796,218 | 8/1998 | Kwon et al. ............... 315/411 |

*Primary Examiner*—Edward P. Westin
*Assistant Examiner*—Nikita Wells
*Attorney, Agent, or Firm*—Robert E. Bushnell, Esq.

[57] ABSTRACT

A wide band high voltage stabilizing circuit supplies optimum voltage to a fly back transformer (FBT) according to the change of horizontal frequency or high voltage by connecting a charge storage unit and switching element to a primary coil of the FBT, the switching element being turned on or off according to a switching signal which a microcomputer recognizing a horizontal sync frequency signal applies corresponding to a frequency band.

20 Claims, 4 Drawing Sheets

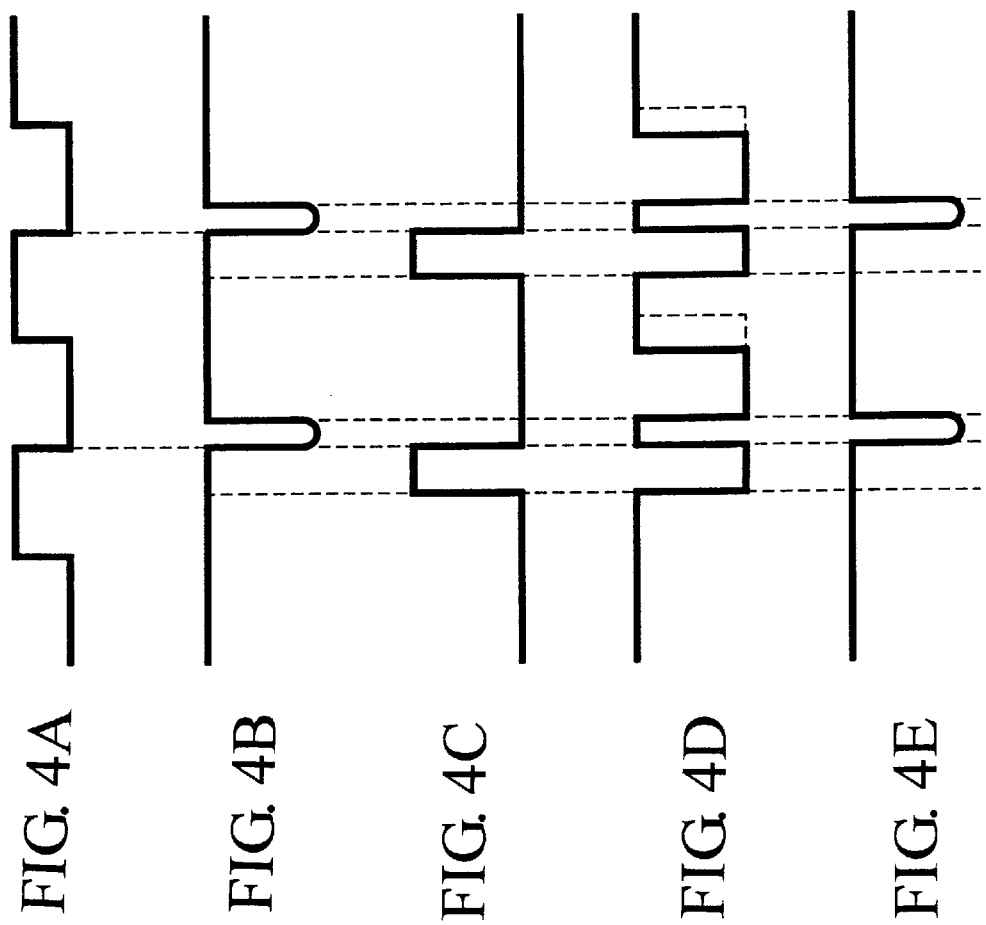

WIDE BAND HIGH VOLTAGE STABILIZING CIRCUIT

CLAIM OF PRIORITY

This application makes reference to, incorporates the same herein, and claims all benefits accruing under 35 U.S.C. §119 from an application for *WIDE BAND HIGH VOLTAGE STABILIZING CIRCUIT* earlier filed in the Korean Industrial Property Office on Dec. 4, 1996, and there duly assigned Serial No. 61626/1996, a copy of which is annexed hereto.

BACKGROUND OF THE INVENTION

1. Technical Field

The present invention relates to a display device and, more particularly, to a wide band high voltage stabilizing circuit for supplying optimum voltage to a fly back transformer (FBT) according to a change of horizontal frequency or high voltage, by connecting a charge storage unit and switching element to a primary coil of the FBT, the switching element being turned on or off according to a switching signal which a microcomputer recognizing a horizontal synchronization (sync) frequency signal generates corresponding to a frequency band.

2. Related Art

In display devices using a cathode ray tube (CRT), a horizontal deflection current is produced in a horizontal deflection coil to create a magnetic field used to deflect an electron beam (produced by a cathode of the CRT) back and forth across a display screen. As the electron beam is scanned back and forth across the display screen, it is modulated to produce on the display screen spots of varying luminous intensity, thus forming an image to be viewed.

A horizontal deflection circuit is used in display devices using a CRT. Some examples of horizontal deflection circuits are disclosed in U.S. Pat. No. 5,614,794 for *Horizontal Deflection Circuit for a Multisync Monitor* issued to Yu, U.S. Pat. No. 5,561,354 for *Horizontal Deflection* issued to Simons et al., U.S. Pat. No. 5,420,484 for *Deflection Apparatus for Raster Scanned CRT Displays* issued to Morrish, and U.S. Pat. No. 5,469,029 for *Deflection Apparatus for Raster Scanned CRT Displays* issued to Jackson et al.

In display devices using a CRT, the display can be improved if a stabilization circuit is used. Some examples of stabilization circuits are disclosed in U.S. Pat. No. 5,266,871 for *High Voltage Stabilization Circuit for Video Display Apparatus* issued to Haferl, U.S. Pat. No. 5,625,261 for *Stabilizing Circuit for Stabilizing the Horizontal Picture Size on the Display of a Television Receiver* issued to Ogawa, U.S. Pat. No. 5,656,890 for *High-Voltage Stabilizer Circuit for a Monitor* issued to Park, U.S. Pat. No. 5,317,495 for *Stabilized High Voltage Power Supply Circuit* issued to Furukawa, and U.S. Pat. No. 5,463,290 for *Power Supply Stabilization Circuit with Separate AC/DC Negative Feedback Paths* issued to Fitzgerald.

Generally, it is considered desirable for display devices such as cathode ray tubes to include features such as an inexpensive manufacturing cost and an optimum operating capability. Some examples of patents which can help accomplish those features are disclosed in U.S. Pat. No. 3,626,238 for *Thyristor Controlled Power Supply Circuits and Deflection Circuitry Associated with a Kinescope* issued to Forster, U.S. Pat. No. 3,863,096 for *Spot Killer Network for Cathode Ray Tube* issued to Sennik, U.S. Pat. No. 3,706,023 for *High Voltage Regulation Circuit for Television Receiver* issued to Yamada et al., U.S. Pat. No. 5,644,198 for *Flyback Transformer Driving Apparatus for Video Display Appliances* issued to Park, U.S. Pat. No. 5,691,609 for *Power Supply for a Raster Center Controller for a Video Display Appliance* issued to Park, U.S. Pat. No. 3,740,571 for *High Voltage Dual Isolated Output Tracking Power Supply* issued to Richards, Jr. et al., U.S. Pat. No. 3,657,632 for *Rectifying Device* issued to Miyoshi, U.S. Pat. No. 5,682,083 for *Spot Removing Circuit for a CRT with Grid Control Means* issued to Shin, U.S. Pat. No. 3,649,901 for *High Voltage Hold-Down Circuit* issued to Waltner, U.S. Pat. No. 5,650,696 for *Method and Apparatus for Protection of EHT and/or Scan Output Stages in Multiscan Displays* issued to Krause et al., and U.S. Pat. No. 5,672,939 for *Moire Control of a Color Display Device* issued to Hsiesh.

I believe that there is a demand to further enhance display devices using cathode ray tubes by providing an improved wide band high voltage stabilizing circuit.

SUMMARY OF THE INVENTION

It is an object of the present invention to provide a wide band high voltage stabilizing circuit that substantially obviates one or more of the limitations and disadvantages of the related art.

It is a further object of the present invention to provide a wide band high voltage stabilizing circuit for stabilizing a high voltage circuit responding to a wide band frequency through connecting a microcomputer, which generates different control signals according to horizontal frequencies, a switching element, which operates responding to a switching signal of the microcomputer, and a number of capacitors, which are selectively connected according to the switching element, to the primary coil of a FBT.

To achieve these and other advantages, and in accordance with the purpose of the present invention as embodied and broadly described, a wide band high voltage stabilizing circuit for a fly back transformer which induces high voltage to an anode of a cathode ray tube, the circuit includes: a microcomputer for generating a signal according to a frequency band of an input horizontal sync frequency; a switching element which switches according to the signal output by the microcomputer; and multiple charge storage units which are selectively connected to a primary coil of the fly back transformer depending upon ON or OFF of the switching element, whereby a volume of current across a primary coil of the fly back transformer can be controlled.

In another aspect, the present invention provides a wide band high voltage stabilizing circuit for a fly back transformer which induces high voltage to an anode of a cathode ray tube, the circuit including: a microcomputer for generating a signal according to a frequency band of an input horizontal sync frequency: and a stabilizing circuit for controlling a volume of current across a primary coil of the fly back transformer according to the signal output by the microcomputer, thereby implementing the stabilization of a signal against the input horizontal sync signal of wide band.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 4A to 4E illustrate waveform diagrams of signals generated from corresponding nodes in FIG. 3.

DETAILED DESCRIPTION OF THE PREFERRED EMBODIMENT

Figure 1:
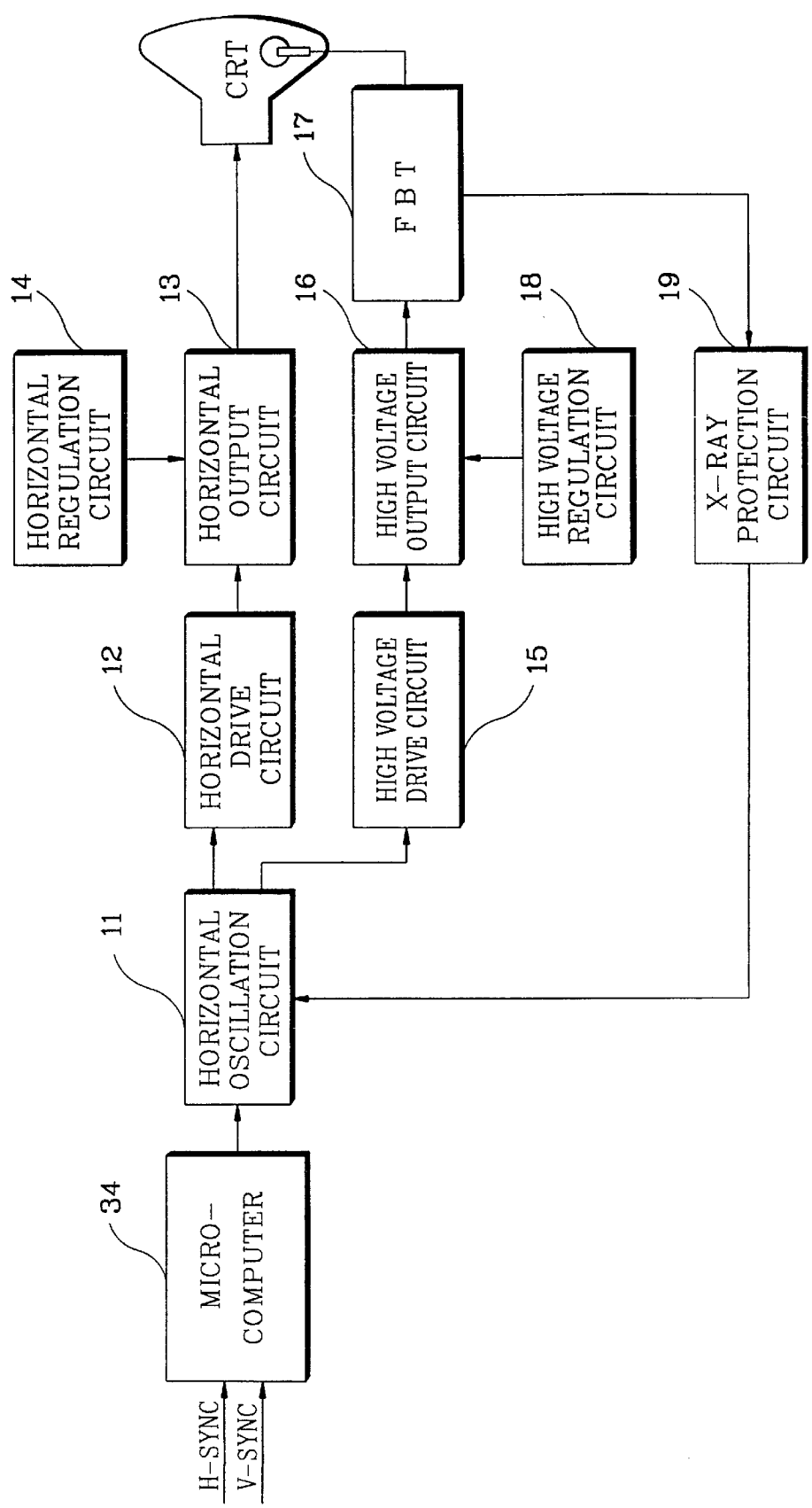
FIG. 1 illustrates a block diagram of a horizontal deflection system in a display device.

Refer now to the drawings and particularly to FIG. 1, which illustrates a block diagram of a horizontal deflection system in a display device. There is a microcomputer 34 receiving a horizontal synchronization signal (H_sync) and a vertical synchronization signal (V_sync), and generating a control signal. There is a horizontal oscillation circuit 11 outputting a saw tooth wave and outputting a pulse signal. The sawtooth wave is also known as a horizontal deflection signal. The sawtooth wave output from the horizontal deflection circuit 11 corresponds to the charge and discharge characteristics of a capacitor using the supply voltage applied from a voltage supply stage which converts AC voltage into DC voltage. In other words, the sawtooth wave is generated at a particular frequency for horizontal deflection. There is a horizontal drive circuit 12 buffer-amplifying the pulse signal which is output by the horizontal oscillation circuit 11, to supply base current enough for turning off or on a horizontal output transistor, and correcting a waveform, a horizontal output circuit 13 making a saw tooth wave travel through a deflection coil, according to the switching operation of the horizontal output transistor which operates using enough current applied by horizontal drive circuit 12, a horizontal regulation circuit 14 transmitting a signal for the control of a horizontal size to a horizontal output circuit 13, a high voltage drive circuit 15 for inducing high voltage to the anode in a cathode ray tube (CRT) using a sawtooth wave generated by horizontal oscillation circuit 11, a high voltage output circuit 16 amplifying the voltage output by high voltage drive circuit 15 to generate a driving voltage for fly back transformer (FBT) 17, a high voltage regulation circuit 18 controlling an output cycle of a high voltage output circuit 16, and an X-RAY protection circuit 19 stopping the operation of the horizontal oscillation circuit 11 when detecting that the output high voltage of FBT 17 exceeds a predetermined limit.

The anode voltage in a CRT is made using a fly back pulse of a horizontal output, while the anode voltage over 23 KV is made by driving a FBT using a special circuit having a similar structure to the horizontal output. Since the anode current in the CRT changes according to the change of load, or the change of image brightness, if a horizontal frequency changes, fly back voltage also changes, thus high voltage shifts. This shift of the high voltage generates noise, resulting in the change of a screen size. This influences the focus, deteriorating the state of the screen. To remove the noise, a special regulation circuit is needed. A chopper circuit which is structured similarly to the Vcc regulation circuit of the horizontal output can be used. In this chopper circuit, the feedback voltage of the FBT is modulated in its pulse width.

Figure 2:
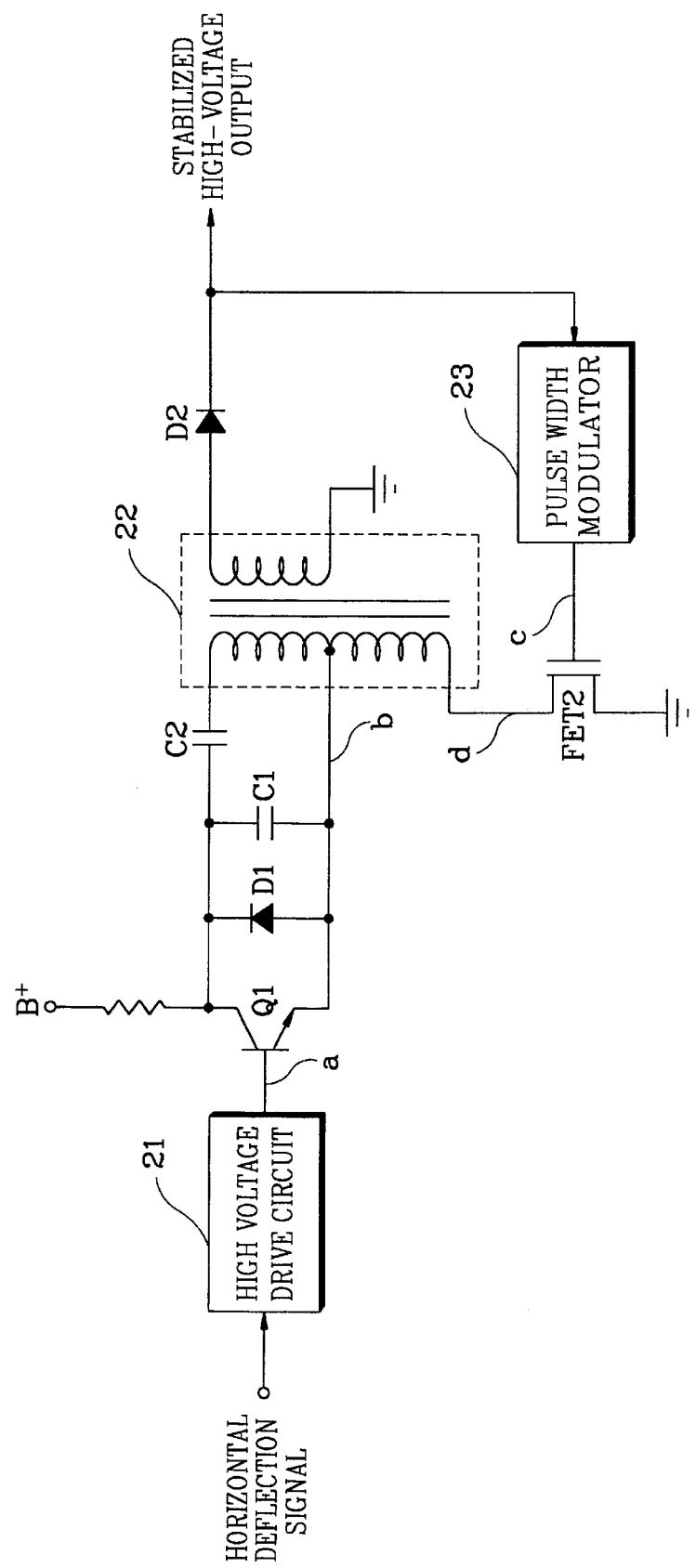
FIG. 2 illustrates a diagram of a high voltage stabilizing circuit.

Turn now to FIG. 2, which illustrates a diagram of a high voltage stabilizing circuit. This circuit consists of a high voltage drive circuit 21 inducing high voltage to the anode in the CRT, receiving a horizontal deflection signal from a horizontal oscillation circuit. The horizontal deflection signal is also known as a saw tooth wave. There is also a high voltage output transistor Q1, which receives a signal output by high voltage drive circuit 21 through its base, a damping diode D1 and capacitors C1 and C2, which are connected to the collector and emitter of high voltage output transistor Q1 in parallel, a diode D2 for rectifying the voltage left in a secondary coil of FBT 22, a pulse width modulation integrated circuit (PWM-IC) 23 for modulating a pulse width of the feedback of induced voltage in the secondary coil of FBT 22, and a field effect transistor FET2 which is switched by an output signal of PWM-IC 23 and controls current across the primary coil of FBT 22.

A horizontal deflection signal, also known as a saw tooth wave, is applied to a high voltage drive circuit 21. The horizontal deflection signal is generated by an automatic frequency control and oscillation circuit, also known as a horizontal oscillation circuit. Optimal current is supplied to the base of high voltage output transistor Q1 according to an output signal of high voltage drive circuit 21.

A high voltage pulse generated by the electromotive force of the FBT 22 is fed back to PWM-IC 23 after passing through rectifying diode D2. PWM-IC 23 adjusts a duty factor of an input pulse and outputs the adjusted pulse to control the switching of field-effect-transistor FET2. The charge and discharge times of capacitor C1 are controlled by PWM-IC 23, thereby implementing the stabilization of a high voltage circuit.

The capacitor C1, which is an element whose capacity cannot be easily varied, does not have difficulty in stabilizing the high voltage of a horizontal frequency of a single band, but is not proper to prevent noise occurring in a high voltage circuit when an input horizontal frequency is changed. When a frequency increases, retrace time according to resonance is constant, but the region of regulation becomes narrower since the value within one horizontal period becomes greater.

Figure 3:
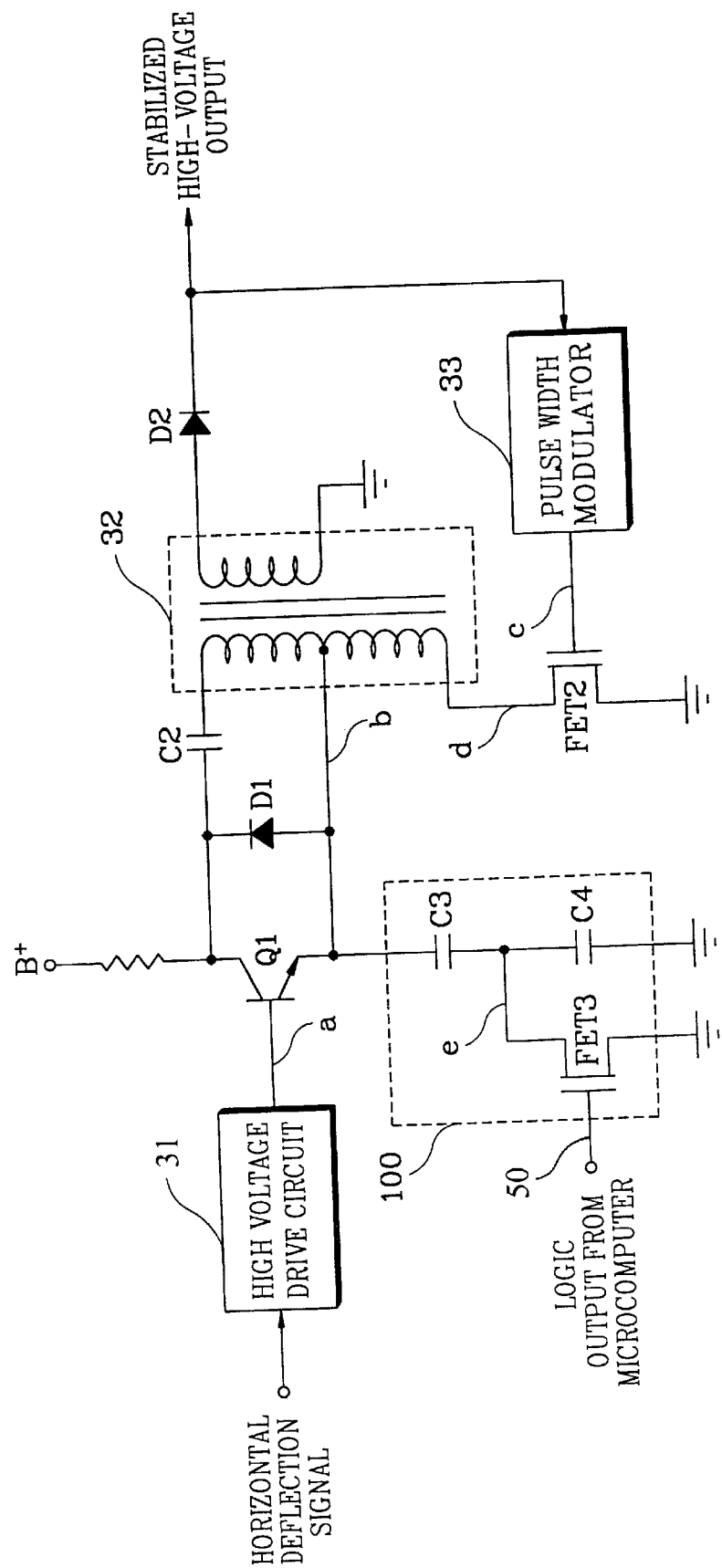
FIG. 3 illustrates a diagram of a wide band high voltage stabilizing circuit, according to the principles of the present invention.

Turn now to FIG. 3, which illustrates a diagram of a wide band high voltage stabilizing circuit, according to the principles of the present invention. A high voltage drive circuit 31 for inducing high voltage to the anode in the CRT, a high voltage output transistor Q1, which receives a signal output by high voltage drive circuit 31 through its base, a damping diode D1 and capacitor C2, which are connected to the collector and emitter of high voltage output transistor Q1 in parallel, a diode D2 for rectifying the voltage left in a secondary coil of FBT 32, a pulse width modulation integrated circuit (PWM-IC) 33 for modulating a pulse width of the feedback of the induced voltage in the secondary coil of FBT 32, a field effect transistor FET2 which is switched by an output signal of PWM-IC 33 and controls current across the primary coil of FBT 32, and a stabilizing circuit 100 for connecting line 50 receiving a logic signal input from a microcomputer to the primary coil of FBT 32. The stabilizing circuit 100 consists of a field effect transistor FET3 which switches according to the logic signal received on line 50 from a microcomputer, and capacitors C3 and C4 which are connected in series between the drain of field effect transistor FET3 and the primary coil of FBT 32.

The operation of the present invention is as follows. First, note that the operations of the same elements as those of the high voltage output circuit previously described will not be elaborated upon. A microcomputer receives a horizontal sync frequency (H_sync) and performs bandpass-filtering with the input horizontal frequency. The microcomputer generates a "HIGH" signal when the input horizontal signal is low frequency, and a "LOW" signal when the input horizontal signal is high frequency. The HIGH/LOW signal output from the microcomputer discussed above is labeled as "logic output from microcomputer" in FIG. 3 and is received by FET3 on line 50. Field effect transistor FET3 is turned on or off according to the logic output from microcomputer on line 50 ("HIGH" or "LOW"), and either one or both of the capacitors, C3 and C4, is selected to be connected to the primary coil of FBT 32. It is preferable that the capacitance of capacitor C3 is greater than that of capacitor C4.

When the logic output from microcomputer on line 50 is "HIGH", or the input horizontal frequency is a signal in a low frequency band, field effect transistor FET3 is turned on, thus current flows to capacitor C3 and the primary coil of FBT 32 and no substantial current flows to capacitor C4. When the logic output from microcomputer on line 50 is "LOW", or the input horizontal frequency is a signal in a high frequency band, field effect transistor FET3 is turned off, thus current flows to the two capacitors C3 and C4 and to the primary coil of FBT 32. The effective capacitance of the stabilizing circuit 100 is reduced when the logic output from microcomputer on line 50 is "LOW." The effective capacitance of the stabilizing circuit 100 is increased when the logic output from microcomputer on line 50 is "HIGH."

Refer now to FIGS. 4A to 4E, which illustrate waveform diagrams of signals generated from corresponding nodes in FIG. 3. As shown in FIG. 3 and FIGS. 4A to 4E, the output signal of high voltage drive circuit 31 is applied to the base (node a) of high voltage output transistor Q1. The signal has a waveform shown in FIG. 4A. A signal at the emitter (node b) of high voltage output transistor Q1 has a waveform shown in FIG. 4B. A signal, transmitted from PWM-IC 33 to the gate (node c) of field effect transistor FET2, has the narrower pulse width than the signal of FIG. 4A, and synchronously becomes down at the down time of the signal shown in FIG. 4B. This signal is shown in FIG. 4C. The waveform of a signal at the drain (node d) of FET2 is shown in FIG. 4D, where the signal of FIG. 4C is inverted and then becomes down at the rising time of the signal shown in FIG. 4B. The waveform at the connection point (node e) of capacitors, C3 and C4, is shown in FIG. 4E which is the same as FIG. 4B.

Change of a signal according to the operation of the present invention is as follows. FET3 is turned on or off according to the output signal of microcomputer 34. The logic output from microcomputer on line 50 is "HIGH" when an input horizontal sync signal is low frequency of about 31 kHz. FET3 is then turned on, thus current flows to capacitor C3 and the primary coil of FBT 32 and no substantial current flows to capacitor C4. When the horizontal sync signal is high frequency, the logic output from microcomputer on line 50 is a "LOW" signal and field effect transistor FET3 is turned off, thus current flows to the two capacitors C3 and C4 and to the primary coil of FBT 32.

Since two capacitors, C3 and C4, which are charge storage elements, are connected in series to the primary coil of FBT 32 in a high voltage output stage when a horizontal frequency of a high frequency band is input, effective capacitance decreases and a volume of current increases. The duty of retrace time becomes less, and a duty control width of PWM-IC 33 becomes wider. Therefore, the present invention can prevent a saturation occurring in prior art and implement the stabilization of high voltage at high frequency. The strength of the voltage left in the secondary coil of FBT 32 varies according to input horizontal frequencies, and influences the duty control value of PWM-IC 33, thus allowing the stabilization of a high voltage circuit.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A high voltage stabilizing circuit for a fly back transformer having a primary coil which induces high voltage to the anode of a cathode ray tube, the circuit comprising:
    a microcomputer for generating a logic signal based on the frequency of a horizontal synchronization input; and
    a stabilizing circuit for controlling current through the primary coil of the fly back transformer according to the logic signal output of said microcomputer, said stabilizing circuit being coupled to the primary coil, said microcomputer, and a local reference potential.

2. The circuit according to claim 1, wherein said microcomputer generates a first logic signal when the input horizontal sync frequency is within a first predetermined frequency band and generates a second logic signal when the input horizontal sync frequency is within a second predetermined frequency band.

3. The circuit as claimed in claim 1, wherein said stabilizing circuit comprises:
    a switching element which operates according to the logic signal output by said microcomputer; and
    multiple charge-storage means including at least a first and a second storage unit, said first storage unit being selectively connected to the primary coil depending on the state of said switching element, whereby a current through the primary coil can be controlled.

4. The circuit according to claim 3, wherein said multiple charge-storage means comprises a plurality of capacitors connected in series between a tap of the primary coil and ground.

5. The circuit according to claim 4, wherein said switching element is a field-effect transistor connected in parallel with at least one of said capacitors, whose control electrode receives the logic signal output from said microcomputer.

6. A high voltage stabilizing circuit for a fly back transformer having a primary coil which induces high voltage to the anode of a cathode ray tube, the circuit comprising:
    a microcomputer receiving a horizontal synchronization signal, and outputting a logic signal according to a frequency of the horizontal synchronization signal; and
    a stabilizing circuit controlling current through the primary coil according to the logic signal output from said microcomputer.

7. The circuit of claim 6, wherein the logic signal output from said microcomputer is a signal selected from a group consisting of a first logic signal and a second logic signal.

8. The circuit of claim 7, wherein said microcomputer outputs the first logic signal when the frequency of the received horizontal synchronization signal is among a first plurality of frequencies and outputs the second logic signal when the frequency of the received horizontal synchronization signal is among a second plurality of frequencies.

9. The circuit of claim 6, wherein said stabilizing circuit comprises:
    a switching unit switching according to the logic signal output from said microcomputer; and a plurality of storage units storing electrical charge, said plurality of storage units including at least a first and a second storage unit, said first storage unit being selectively connected to the primary coil according to a state of said switching unit, said plurality of storage units controlling a current through the primary coil.

10. The circuit of claim 9, wherein said plurality of storage units comprises a plurality of capacitors connected in series disposed between an intermediate location on the primary coil and a local reference potential.

11. The circuit of claim 10, wherein said switching unit corresponds to a transistor having a control electrode receiving the logic signal output from said microcomputer, a first electrode of a principal electrically conducting channel connected to a first terminal of a first capacitor among said plurality of capacitors, and a second electrode of said principal electrically conducting channel connected to a second terminal of said first capacitor.

12. The circuit of claim 9, wherein said plurality of storage units comprises a primary plurality of capacitors connected in series disposed between an intermediate location on the primary coil and a local reference potential.

13. The circuit of claim 12, wherein said primary plurality of capacitors comprises at least two capacitors including a first capacitor and a second capacitor.

14. The circuit of claim 13, wherein said switching unit corresponds to a transistor having a control electrode receiving the logic signal output from said microcomputer, and first and second electrodes of a principal electrically conducting channel connected across said second capacitor.

15. The circuit of claim 8, wherein said stabilizing circuit comprises:
   a switching unit receiving said first and second logic signals output from said microcomputer, switching to a first state in response to said first logic signal and switching to a second state in response to said second logic signal;
   a first storage unit, storing electrical charge, disposed between the primary coil and said switching unit; and
   a second storage unit, storing electrical charge, connected electrically to the primary coil in response to said switching unit switching to said second state, not connected electrically to the primary coil in response to said switching unit switching to said first state, and controlling a volume of current through the primary coil.

16. The circuit of claim 8, wherein said stabilizing circuit comprises:
   a switching unit receiving said first and second logic signals output from said microcomputer, switching to a first state in response to said first logic signal and switching to a second state in response to said second logic signal; and
   a primary plurality of storage units storing electrical charge and being connected in series, said primary plurality of storage units including at least one primary storage unit and at least one secondary storage unit, said at least one secondary storage unit being selectively connected to the primary coil according to said switching unit, said primary plurality of storage units controlling a volume of current through the primary coil.

17. The circuit of claim 16, wherein said primary plurality of storage units comprises:
   said at least one primary storage unit being disposed between the primary coil and said switching unit; and
   said at least one secondary storage unit being connected to said at least one primary storage unit in response to said switching unit switching to said second state, and being not connected to said at least one primary storage unit in response to said switching unit switching to said first state.

18. A circuit for controlling voltages to a cathode ray tube, comprising:
   a first transistor having a control electrode connected to indirectly respond to a horizontal synchronization frequency signal, a first electrode of a principal electrically conducting channel connected to a reference potential, and a second electrode of said principal electrically conducting channel;
   a transformer having a primary coil and a secondary coil, said primary coil having a first terminal and a second terminal, said secondary coil having a first terminal and a second terminal, said first terminal of said secondary coil connected to said reference potential;
   a first capacitor disposed between said reference potential and said second electrode of said principal electrically conducting channel of said first transistor;
   a second capacitor disposed between said first terminal of said primary coil and said second electrode of said principal electrically conducting channel of said first transistor;
   a pulse width modulator having a first terminal and a second terminal;
   a first diode having an anode and a cathode, said anode connected to said second terminal of said secondary coil, said cathode connected to said first terminal of said pulse width modulator;
   a single coil having a first terminal and a second terminal, said second terminal of said single coil connected to said first terminal of said primary coil of said transformer;
   a second transistor having a control electrode connected to said second terminal of said pulse width modulator, a first electrode of a principal electrically conducting channel connected to said first terminal of said single coil, and a second electrode of said principal electrically conducting channel connected to said reference potential;
   a second diode having an anode and a cathode, said anode connected to said first terminal of said primary coil;
   a third capacitor disposed between said second terminal of said primary coil and said cathode of said second diode;
   a high voltage drive circuit; and
   a third transistor having a control electrode connected to said high voltage drive circuit, a first electrode of a principal electrically conducting channel connected to said cathode of said second diode, and a second electrode of said principal electrically conducting channel connected to said first terminal of said primary coil.

19. The circuit of claim 18, wherein said first and second transistors are field effect transistors and said third transistor is a transistor of p-type.

20. The circuit of claim 18, wherein a microcomputer generates a control signal in response to said input horizontal synchronization frequency signal and sends said control signal to said control electrode of said first transistor.

* * * * *